(12) United States Patent
Flocco

(10) Patent No.: US 10,112,465 B2
(45) Date of Patent: Oct. 30, 2018

(54) VENTED TONNEAU COVER FOR A CARGO BED OF A PICKUP TRUCK

(71) Applicant: Richard Flocco, Patterson, NY (US)

(72) Inventor: Richard Flocco, Patterson, NY (US)

( * ) Notice: Subject to any disclaimer, the term of this patent is extended or adjusted under 35 U.S.C. 154(b) by 0 days.

(21) Appl. No.: 15/455,282

(22) Filed: Mar. 10, 2017

(65) Prior Publication Data
US 2018/0257466 A1    Sep. 13, 2018

(51) Int. Cl.
*B60P 7/02*     (2006.01)
*B60J 7/10*     (2006.01)
*G09F 21/04*    (2006.01)

(52) U.S. Cl.
CPC ............ *B60J 7/104* (2013.01); *G09F 21/048* (2013.01)

(58) Field of Classification Search
CPC . B60R 1/12; B60R 1/1207; B60R 2001/1253; B60R 2001/1223; B60R 2001/1215; G07C 2009/00928; G07C 2009/00793; G07C 9/00309; G08C 17/02; E05Y 2900/106; B60J 7/102; B60J 7/141; B60J 7/104; B60J 7/198; B60P 7/04; B60P 7/02
USPC ..... 296/37.7, 37.8, 100.16, 100.01; 160/188, 160/201; 307/10.1; 341/176
See application file for complete search history.

(56) References Cited

U.S. PATENT DOCUMENTS

| | | | | |
|---|---|---|---|---|
| 3,806,185 A * | 4/1974 | Brandjord | ................ | B60J 7/062 296/98 |
| 4,739,528 A * | 4/1988 | Allen | ................ | B60P 7/0876 296/100.15 |
| 4,838,602 A * | 6/1989 | Nett | .................. | B60J 7/104 296/100.18 |
| 4,867,498 A * | 9/1989 | Delphia | .................. | B60R 7/04 224/311 |
| 4,923,240 A * | 5/1990 | Swanson | .................. | B60J 7/104 160/378 |
| 4,991,640 A * | 2/1991 | Verkindt | .................. | B60P 7/04 160/368.1 |
| 5,076,338 A * | 12/1991 | Schmeichel | ............. | B60J 7/104 160/368.1 |
| 5,174,353 A * | 12/1992 | Schmeichel | ............. | B60J 7/104 160/328 |
| 5,267,761 A * | 12/1993 | Curtindale | ................ | B60R 7/04 292/81 |
| 5,328,310 A * | 7/1994 | Lockney | ............... | B60P 7/0876 289/1.2 |
| 5,388,880 A * | 2/1995 | Kinane | ............... | B60R 11/0264 224/311 |
| 5,487,585 A * | 1/1996 | Wheatley | ................ | B60J 7/104 160/368.1 |
| 5,522,638 A * | 6/1996 | Falcoff | ................ | B60R 7/04 224/282 |

(Continued)

*Primary Examiner* — Kiran B Patel
(74) *Attorney, Agent, or Firm* — Charles E. Baxley

(57) ABSTRACT

A vented tonneau cover for a cargo bed of a pickup truck. The cargo bed of the pickup truck is defined by a pair of side walls having tops, respectively, and a tailgate to access the cargo bed of the pickup truck. The top of each side wall of the cargo bed of the pickup truck has a pair of ends. Each end of the top of each side wall of the cargo bed of the pickup truck has a through bore therein. The vented tonneau covering includes netting that covers the cargo bed of the pickup truck, and an apparatus that holds down the netting over the cargo bed of the pickup truck.

12 Claims, 3 Drawing Sheets

(56) References Cited

U.S. PATENT DOCUMENTS

| | | | | |
|---|---|---|---|---|
| 5,526,866 A * | 6/1996 | Flentge | B60J 7/102 | 160/377 |
| 5,540,475 A * | 7/1996 | Kersting | B60J 7/185 | 224/331 |
| 5,584,521 A * | 12/1996 | Hathaway | B60J 7/104 | 224/405 |
| 5,873,597 A * | 2/1999 | Sim | B60N 3/002 | 280/727 |
| 5,887,929 A * | 3/1999 | Miller | B60R 7/04 | 296/37.7 |
| 5,887,934 A * | 3/1999 | Smith | B60J 7/102 | 296/100.16 |
| 5,887,939 A * | 3/1999 | Yamaguchi | B62D 65/04 | 296/146.7 |
| 5,888,040 A | 3/1999 | Walsh | | |
| 6,024,402 A * | 2/2000 | Wheatley | B60J 7/102 | 224/403 |
| 6,062,623 A * | 5/2000 | Lemmen | B60R 7/04 | 224/282 |
| 6,116,675 A * | 9/2000 | Iwasawa | B60N 3/12 | 224/309 |
| 6,124,822 A * | 9/2000 | Wu | B60R 11/0264 | 296/37.7 |
| 6,412,848 B1 * | 7/2002 | Ceccanese | B60K 35/00 | 224/311 |
| 6,619,719 B1 * | 9/2003 | Wheatley | B60J 7/085 | 296/100.12 |
| 6,817,644 B2 | 11/2004 | Moore | | |
| 6,957,839 B1 * | 10/2005 | Tiesler | B60R 7/04 | 224/311 |
| 7,008,000 B1 * | 3/2006 | Schmeichel | B60J 7/085 | 296/100.16 |
| 7,048,277 B1 * | 5/2006 | Schmeichel | B60J 7/102 | 296/100.11 |
| 7,098,411 B1 * | 8/2006 | McConnell | H01H 13/83 | 200/310 |
| 7,448,836 B2 * | 11/2008 | Clarke | B60P 7/0876 | 410/118 |
| 7,815,239 B1 * | 10/2010 | Schmeichel | B60J 11/00 | 296/136.01 |
| 8,272,821 B2 | 9/2012 | Digman | | |
| 8,657,358 B2 | 2/2014 | Garska | | |
| 8,702,151 B2 | 4/2014 | Mayfield | | |
| 8,777,293 B2 | 7/2014 | Garska | | |
| 8,794,690 B1 | 8/2014 | Al-Saeed | | |
| 8,807,624 B2 | 8/2014 | Garska | | |
| 8,807,625 B2 | 8/2014 | Garska | | |
| 8,857,887 B1 * | 10/2014 | Schmeichel | B60P 7/04 | 296/100.18 |
| 8,894,127 B2 | 11/2014 | Garska | | |
| 8,973,969 B1 * | 3/2015 | Potter | B60P 7/0876 | 296/100.15 |
| 9,296,285 B2 | 3/2016 | Copp | | |
| 9,399,390 B1 | 7/2016 | Shortz | | |
| 9,840,135 B2 * | 12/2017 | Rusher | B60J 7/141 | |
| 9,924,765 B1 * | 3/2018 | Coronel | A44B 18/0069 | |
| 2001/0022453 A1 * | 9/2001 | Tucker | B60J 7/104 | 296/100.15 |
| 2002/0140289 A1 * | 10/2002 | McConnell | B60R 11/02 | 307/10.1 |
| 2002/0180235 A1 * | 12/2002 | Wheatley | B60J 7/102 | 296/100.16 |
| 2003/0057726 A1 * | 3/2003 | Wheatley | B60J 7/102 | 296/100.18 |
| 2003/0102698 A1 * | 6/2003 | Stevens | B60J 7/104 | 296/225 |
| 2003/0169522 A1 * | 9/2003 | Schofield | B60R 1/04 | 359/876 |
| 2004/0119314 A1 * | 6/2004 | Haack | B60J 7/102 | 296/100.18 |
| 2007/0057528 A1 * | 3/2007 | Fox | B60P 7/0876 | 296/100.16 |
| 2008/0104808 A1 * | 5/2008 | Badalamenti | B60J 7/104 | 24/459 |
| 2008/0143133 A1 * | 6/2008 | Nichols | B60P 7/0815 | 296/3 |
| 2010/0123331 A1 * | 5/2010 | Buelna | B65D 88/124 | 296/100.15 |
| 2010/0133872 A1 * | 6/2010 | Kosinski | B60J 7/102 | 296/100.09 |
| 2011/0169296 A1 * | 7/2011 | Schrader | B60J 7/102 | 296/100.15 |
| 2013/0001979 A1 * | 1/2013 | Rusher | B60J 7/141 | 296/100.07 |
| 2013/0093206 A1 * | 4/2013 | Rusher | B60P 7/02 | 296/100.14 |
| 2014/0042754 A1 * | 2/2014 | Spencer | B60J 7/185 | 292/7 |
| 2014/0246877 A1 * | 9/2014 | Spencer | B60J 7/085 | 296/100.17 |
| 2015/0102628 A1 * | 4/2015 | Potter | B60J 7/104 | 296/100.16 |
| 2015/0107065 A1 * | 4/2015 | Doering | B60P 7/0838 | 24/68 CD |
| 2015/0147519 A1 * | 5/2015 | Siegel | B60J 7/10 | 428/99 |
| 2015/0239388 A1 * | 8/2015 | Potter | B60P 7/04 | 296/100.12 |
| 2015/0298596 A1 * | 10/2015 | Blohm | B60P 7/0876 | 410/96 |
| 2016/0062513 A1 * | 3/2016 | Turnbull | H03K 17/962 | 345/174 |
| 2016/0075220 A1 * | 3/2016 | Williamson | B60J 7/068 | 296/98 |
| 2016/0280123 A1 * | 9/2016 | Rohr | B60J 7/068 | |
| 2016/0339827 A1 * | 11/2016 | Dexter | B60P 7/0876 | |
| 2016/0347233 A1 * | 12/2016 | Kingery | B60P 7/0846 | |
| 2017/0066311 A1 * | 3/2017 | Facchinello | B60J 7/198 | |
| 2017/0297474 A1 * | 10/2017 | Hemphill | B60P 7/0815 | |
| 2018/0029454 A1 * | 2/2018 | Freitas | B60P 7/0876 | |
| 2018/0084871 A1 * | 3/2018 | Coronel | A44B 18/0069 | |
| 2018/0118002 A1 * | 5/2018 | Koengeter | B60J 10/277 | |
| 2018/0118008 A1 * | 5/2018 | Facchinello | B60J 7/141 | |
| 2018/0126833 A1 * | 5/2018 | Hannan | B60J 7/068 | |

* cited by examiner

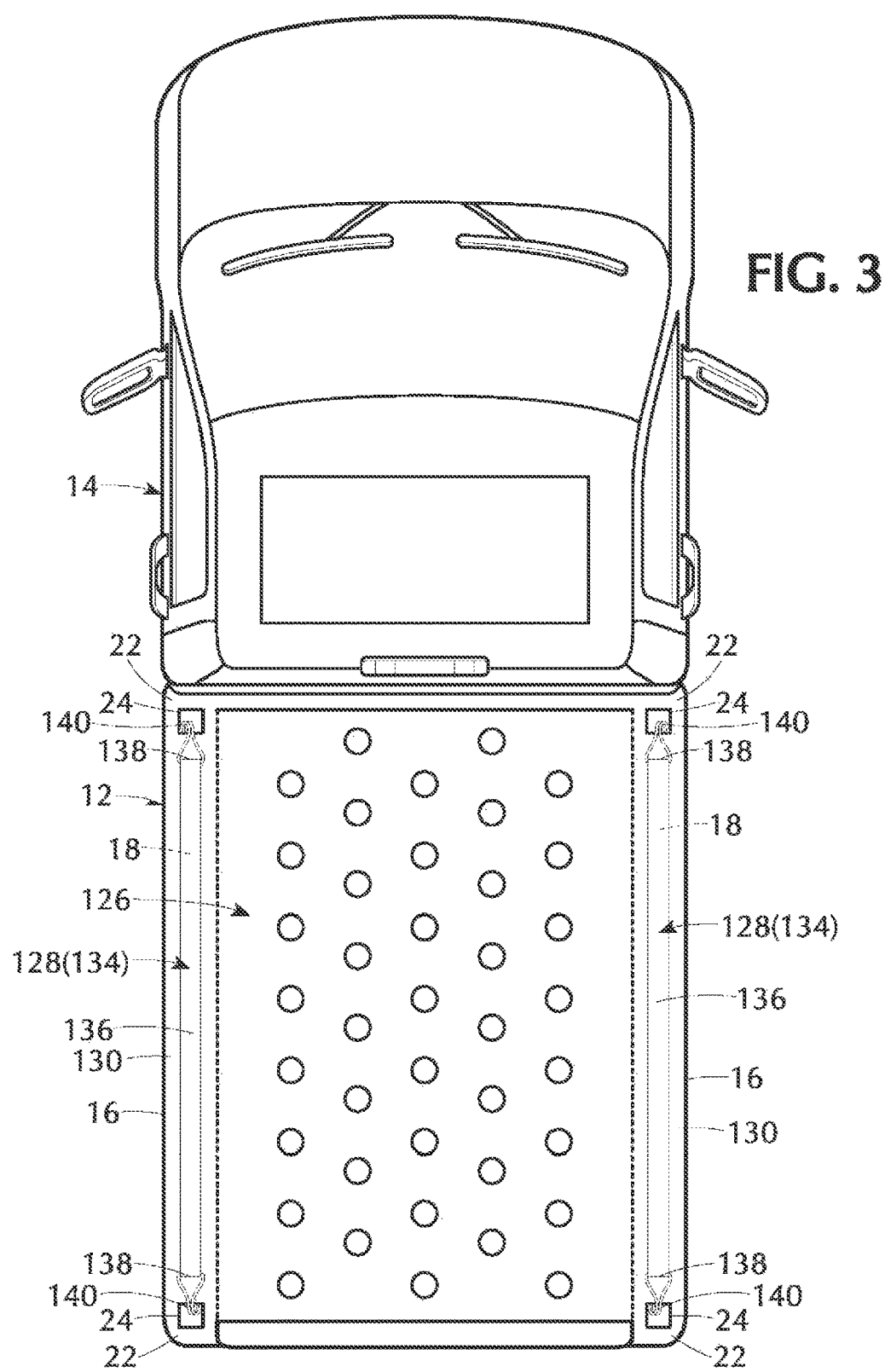

VENTED TONNEAU COVER FOR A CARGO BED OF A PICKUP TRUCK

BACKGROUND OF THE INVENTION

Field of the Invention

The embodiments of the present invention relate to a tonneau cover, and more particularly, the embodiments of the present invention relate to a vented tonneau cover for a cargo bed of a pickup truck.

Description of the Prior Art

A pickup truck is a light duty truck having an enclosed cab and an open cargo area with low sides and a tailgate. Once a work tool with few creature comforts, in the 1950s consumers began purchasing pickups for lifestyle reasons and by the 1990s less than 15% of owners reported use in work as the pickup truck' primary purpose. Today in North America, the pickup truck is mostly used like a passenger car and accounts for about 18% of total vehicles sold in the US.

A truck accessory is an aftermarket part that is used to enhance the style or function of the original OEM pickup truck. Truck accessories are differentiated from other parts, typically referred to as "hard parts" or "cores" that include distributors, water pumps, radiators, and the like. Some of the more popular accessories for light-duty trucks include tubular products, such as, nerf bars, grille guards, truck tool boxes, autocarts, hard top, bed extenders, and tonneau covers.

Numerous innovations for tonneau covers for cargo beds of pickup trucks have been provided in the prior art, which will be described below in chronological order to show advancement in the art, and which are incorporated herein in their entirety by reference thereto. Even though these innovations may be suitable for the specific individual purposes to which they address, nevertheless, they differ from the embodiments of the present invention.

U.S. Pat. No. 5,888,040 to Walsh et al

U.S. Pat. No. 5,888,040—issued to Walsh et al. on Mar. 30, 1999 in US class 410 and subclass 100—teaches a cargo restraint attachment assembly for use with a platform trailer, which includes a body having an interior side and an exterior side opposite thereto. A first section is adjacent to the interior side and is configured to attach the body to a loading deck of the platform trailer so that the body extends outwardly from, and along, at least a portion of a longitudinal edge of the loading deck. A second section is configured to selectively secure the cargo restraint device at a desired position with respect to the longitudinal edge. The assembly may secure at least one cargo restraint device at an angle with respect to a horizontal plane to minimize a bending moment on the cargo restraint device from force applied thereto by engagement with a load on a loading deck of the platform trailer.

U.S. Pat. No. 6,817,644 to Moore

U.S. Pat. No. 6,817,644—issued to Moore on Nov. 16, 2004 in US class 296 and subclass 24.43—teaches a barrier net for motor vehicles of the type having a forward passenger compartment and a cargo area behind the passenger compartment. The barrier net includes a netting member adapted to restrain stowage within the cargo area from entering the passenger compartment. A mechanism is provided for removably attaching both the netting member top to the cargo area and the netting member bottom to the cargo area. The barrier net further includes a mechanism for rendering the netting member taut.

U.S. Pat. No. 8,272,821 to Digman

U.S. Pat. No. 8,272,821—issued to Digman on Sep. 25, 2012 in US class 410 and subclass 115—teaches a portable tie-down anchor device, system, and kit including: a fabric body having a first end; a first clasp coupled to the first end of the fabric body; a tie-down hardware device coupled to the fabric body and configured to adjust a length of the anchor device; a second clasp coupled to the tie-down hardware device; and a plurality of holes positioned along a length of the fabric body. The anchor device is configured to secure cargo to a truck bed. The plurality of holes provide additional anchor points for the truck bed, and are adapted to receive an end of a securement device, such as, a bungee cord, netting, rope, tarp, or an adjustable strap. The first clasp and the second clasp are each configured to removably couple to a permanent anchor located in, or about, the truck bed.

U.S. Pat. No. 8,657,358 to Garska

U.S. Pat. No. 8,657,358—issued to Garska on Feb. 25, 2014 in U.S. class 296 and subclass 100.09—teaches an outer frame corresponding to a perimeter of a pickup truck bed. A plurality of upwardly bowed intermediate rails span between, and are coupled to, opposing sides of the outer frame. Each bowed intermediate rail is paired with a wire tension member that spans between, and is coupled to, each end of its paired intermediate rail member. A flexible textile member covers, and is supported by, the intermediate rail member, and is coupled to the outer frame. The wire tension members operate to help reduce lateral deflection of the bowed intermediate rail members when a meaningful downward force is applied to the bowed intermediate rails. A method of assembling a tonneau cover is also taught.

U.S. Pat. No. 8,702,151 to Mayfield

U.S. Pat. No. 8,702,151—issued to Mayfield on Apr. 22, 2014 in US class 296 and subclass 100.18—teaches a tonneau cover system for a pickup truck bed, which includes an adjustable corner bracket assembly. The corner bracket assembly includes a pivotally connected lower bracket member, an upper bracket member, and a cap member. The upper and lower bracket members are movable between an acute rail configuration and an obtuse rail configuration.

U.S. Pat. No. 8,777,293 to Garska

U.S. Pat. No. 8,777,293—issued to Garska on Jul. 15, 2014 in US class 296 and subclass 100.15—teaches a tonneau cover frame for a pickup truck bed, which includes a cross-car rail bracket with a predetermined gap for receiving a cross-car bow in a plurality of configurations. The cross-car bow is movable laterally within the cross-car rail bracket to allow for a single cross-car bow in a variety of locations within the tonneau cover frame.

U.S. Pat. No. 8,794,690 to Al-Saeed

U.S. Pat. No. 8,794,690—issued to Al-Saeed on Aug. 5, 2014 in US class 296 and subclass 100.1—teaches a pickup truck bed cover having two laterally disposed rigid panels. The panels are hingedly attached to the upper edges of the cargo box sidewalls. Each panel is operated by a separate actuator, with the actuators mounted near the sidewall upper edges to avoid intrusion upon the cargo floor area. The actuators are mounted at about the longitudinal midpoints of the sidewalls to avoid asymmetric forces on the cover panels during operation. The actuators include jackscrews driven by motors that are controlled by a switch panel in the vehicle cab. The motors may be electric, or may include electrohydraulic power packs having electric motors driving hydraulic pumps that in turn drive hydraulic motors to actuate the jackscrews. The gear reduction and threaded jackscrews of each actuator provide positive retention of oversize cargo within the vehicle box, positively locking down any of this kind of cargo to prevent its shifting or unauthorized removal.

U.S. Pat. No. 8,807,624 to Garska

U.S. Pat. No. 8,807,624—issued to Garska on Aug. 19, 2014 in US class 296 and subclass 100.06—teaches a tonneau cover assembly for a pickup truck bed, which includes a plurality of hinge assemblies. Each of the hinge assemblies are secured along the side rail of the tonneau cover assembly, and have a contoured profile to allow for rotation within the tonneau cover assembly to accommodate a non-square truck bed.

U.S. Pat. No. 8,807,625 to Garska

U.S. Pat. No. 8,807,625—issued to Garska on Aug. 19, 2014 in US class 296 and subclass 100.07—teaches a tonneau cover apparatus. In one aspect, the tonneau cover apparatus includes a handle or a lever, a mount, a locator, a finger, a detent, and a complementary peg. In another aspect, a handle and a mount are configured so that the handle is substantially horizontal when in a closed position. A further aspect employs at least one locator to align the tonneau cover to a truck bed. Another aspect includes a finger that is coupled to a handle to clamp the tonneau cover apparatus to a truck bed when the handle is in a closed position, thus securing the tonneau cover to the truck bed.

U.S. Pat. No. 8,894,127 to Garska

U.S. Pat. No. 8,894,127—issued to Garska on Nov. 25, 2014 in US class 296 and subclass 100.18—teaches pickup truck bed tonneau covers and varieties thereof that are manufactured using universal components. An outer frame is made from rails cut from universal rail stock. Universal, adjustable corner brackets can be fixed into a desired position to accommodate all different angles at the corners of the tonneau cover. Intermediate cross car rails are cut from universal rail stock, and all are coupled to the outer frame via universal intermediate rail brackets. Opposing pairs of universal hinge brackets are used for all hinges of the tonneau cover. An elongated step is adjacent to, and protrudes downwardly beyond, a seal coupling channel, with a compressible seal extending along the outer frame. The downwardly protruding elongated step member acts as a continuous elongated stop, limiting compression of the seal member.

United States Patent Application Publication Number 2015/0298596 to Blohm

United States Patent Application Publication Number 2015/0298596—published to Blohm on Oct. 22, 2015 in US class 410 and subclass 96—teaches a cargo net including a body having a network of structural members, a first end, and a second end. Each end defines a sleeve and/or including an elongated strap engagement base. First and second straps, separately formed from the body, ends, sleeves, and/or bases are disposed through the respective sleeves, and/or over the respective bases at the ends. Where the ends include strap slots on opposite ends of the bases, the straps can be weaved through the slots and over the bases. The straps can be ratchet straps and can be generally slidably mounted through the sleeves and/or over the bases or through the strap slots. The ratchet straps can be tightened, thereby further securing cargo under the cargo net. The body, the first end, the second end, the sleeves, and/or the bases can be monolithically formed as a single piece structure. A method of using the cargo net is also taught.

U.S. Pat. No. 9,296,285 to Copp et al

U.S. Pat. No. 9,296,285—issued to Copp et al. on Mar. 29, 2016 in US class 1 and subclass 1; current CPC class B60J 7/196 (20130101); B60J 7/041 (20130101); and current international class B60J 7/14 (20060101); B60J 7/19— teaches a retractable pickup truck box cover system, which includes a pivot joint. A sealing system between the panels and along ends of the panel assembly provides weather resistance to the cover system. A lateral support system provides resistance to binding loads when opening and closing the panel assembly. The lateral support system may also aid installation of the cover system. A ramp adjustment system allows fine tuning of the ramps that guide folding and unfolding of the panel assembly. The locking system includes lock rods that engage rails of the cover system. Connecting structures connect adjacent panel pairs when the cover system is deployed, and do not connect the adjacent panels when the cover system is stowed. A seal of the sealing system includes angled and/or transvers ribs to support a bulb of the seal when pivotally scrubbing against the panels. The seal includes a plurality of interior portions that selectively compress and bulge between the panels. The seal includes a coating that may provide stiffness, wear resistance, hardness, and/or reduced friction. A clamping system allows installation of the cover system without drilling holes, and includes built-in fixturing for locating clamps, and thereby locate the cover system on the pickup truck box.

U.S. Pat. No. 9,399,390 to Shortz Jr

U.S. Pat. No. 9,399,390—issued to Shortz Jr. on Jul. 26, 2016 in US class 1/1 and CPC class B60J 7/085 (20130101)—teaches a retractable tarpaulin for use with a pickup truck, which is an aramid fiber tarpaulin that can be used to protect the bed, shelter large loads, or provide a visible space for advertisements and other messages. The aramid fiber tarpaulin is set up and secured using magnets.

United States Patent Application Publication Number 2016/0339827 to Dexter

United States Patent Application Publication Number 2016/0339827—published to Dexter on Nov. 24, 2016 in US class 1 and subclass 1—teaches an assembly and a method for a fastener assembly for securing a flexible cover over an open enclosure employing corner members coupleable with angled corners of the open enclosure, a plurality of removeably attachable tie down members and fastening members, and a strap for securing the flexible cover about the open enclosure and any cargo therein, and is, particularly, preferred, to be used with a tarpaulin cover for a truck bed to provide a user a system for tying down cargo being transported in truck beds.

United States Patent Application Publication
Number 2016/0347233 to Kingery

United States Patent Application Publication Number 2016/0347233—published to Kingery on Dec. 1, 2016 in US class 1 and subclass 1—teaches an apparatus and system for rope, strap, tie downs, hooks, and nets, which includes a design whereby the apparatus has a thick walled body made of nylon, aluminum, or stainless steel, with a spool and center hub and axle throughout the spool body frame and handle. The apparatus uses multiple coils to automatically retract strap or rope within the spool hub. It also contains a tangential rib opposing the face wheel. The apparatus may have gears on the radius of the wheel, spring loaded slidable pawl plates, or pivotally rotatable pawls or plates that allow the proper engagement of the wheel ratchet. It may also have a rope, a strap, or a belt that is non-cuttable, and corrosion-, petrol-, and chemical-resistant used in tie downs and nets. The apparatus may have a lockable body frame, and/or hooks that are lockable.

It is apparent that numerous innovations for tonneau covers for cargo beds of pickup trucks have been provided in the prior art, which are adapted to be used. Furthermore, even though these innovations may be suitable for the specific individual purposes to which they address, nevertheless, they would not be suitable for the purposes of the embodiments of the present invention as heretofore described.

SUMMARY OF THE INVENTION

Thus, an object of the embodiments of the present invention is to provide a vented tonneau cover for a cargo bed of a pickup truck, which avoids the disadvantages of the prior art.

Briefly stated, another object of the embodiments of the present invention is to provide a vented tonneau cover for a cargo bed of a pickup truck. The cargo bed of the pickup truck is defined by a pair of side walls having tops, respectively, and a tailgate to access the cargo bed of the pickup truck. The top of each side wall of the cargo bed of the pickup truck has a pair of ends. Each end of the top of each side wall of the cargo bed of the pickup truck has a through bore therein. The vented tonneau cover includes netting that covers the cargo bed of the pickup truck, and an apparatus that holds down the netting over the cargo bed of the pickup truck.

The novel features considered characteristic of the embodiments of the present invention are set forth in the appended claims. The embodiments of the present invention themselves, however, both as to their construction and to their method of operation, together with additional objects and advantages thereof will be best understood from the following description of the embodiments of the present invention when read and understood in connection with the accompanying figures of the drawing.

BRIEF DESCRIPTION OF THE FIGURES OF THE DRAWING

The figures of the drawing are briefly described as follows:

FIG. 3 is a diagrammatic top plan view of an alternate embodiment of the vented tonneau cover for a cargo bed of a pickup truck.

LIST OF REFERENCE NUMERALS UTILIZED IN THE FIGURES OF THE DRAWING

Figure 1:
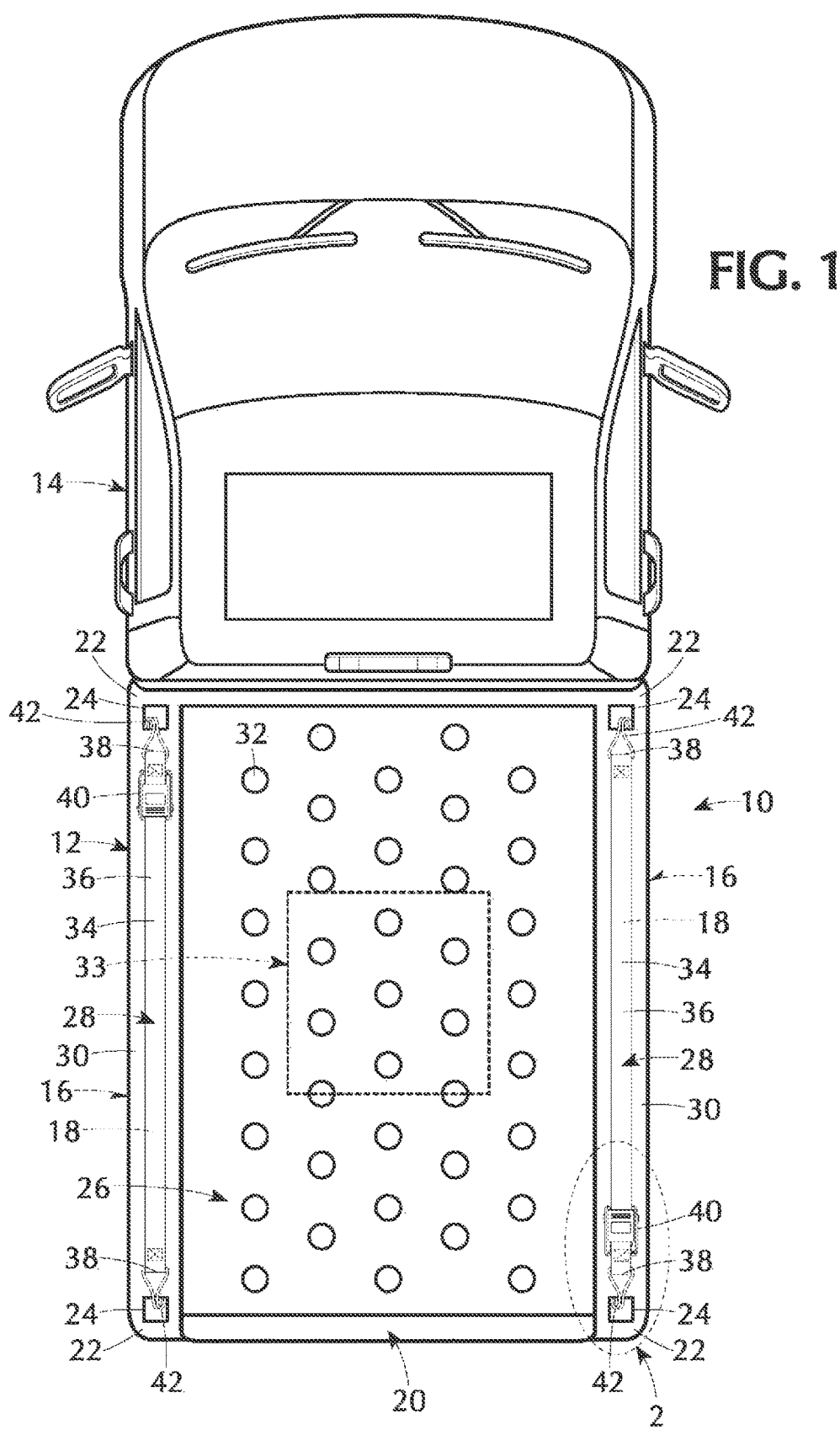
FIG. 1 is a diagrammatic top plan view of a preferred embodiment of the vented tonneau cover for a cargo bed of a pickup truck.

Introductory 10 vented tonneau cover of embodiments of present invention for cargo bed 12 of pickup truck 14
12 cargo bed of pickup truck 14
14 pickup truck
16 pair of side walls defining cargo bed 12 of pickup truck 14
18 tops of pair of side walls defining cargo bed 12 of pickup truck 14, respectively tailgate of cargo bed 12 of pickup truck 14
22 pair of ends of top 18 of each side wall of pair of side walls 16
24 through bore of each end of pair of ends of top 18 of each side wall of pair of side walls 16

Overall Configuration of Vented Tonneau Cover 10

26 netting for covering cargo bed 12 of pickup truck 14
28 preferred embodiment of apparatus for holding down netting 26 over cargo bed 12 of pickup truck 14

Specific Configuration of Netting 26

30 pair of axial boundaries of netting 26 for resting upon tops 18 of side walls 16 of cargo bed 12 of pickup truck 14, respectively
32 plurality of through bores of netting 26 for allowing cargo bed 12 of pickup truck 14 to vent and breathe
33 printed matter of netting 26 for purposes including advertisement

Specific Configuration of Preferred Embodiment of Apparatus 28

34 pair of ratchet hold downs of apparatus 28
36 strap of each ratchet hold down of pair of ratchet hold downs 34 of apparatus 28
38 pair of ends of strap 36 of each ratchet hold down of pair of ratchet hold downs 34 of apparatus 28
40 ratchet assembly of each ratchet hold down of pair of ratchet hold down 34 of apparatus 28
42 hooks and/or loops of each ratchet hold down of pair of ratchet hold downs 34 of apparatus 28

Specific Configuration of Alternate Embodiment of Apparatus 128

128 apparatus
134 pair of bungee cords of apparatus 128
136 elastic strap of each bungee cord of pair of bungee cords 134 of apparatus 128
138 pair of ends of elastic strap 136 of each bungee cord of pair of bungee cords 134 of apparatus 128

140 pair of hooks of each bungee cord of pair of bungee cords 134 of apparatus 128 for engaging an associated pair of axially aligned through bores 24 at pair of ends 22 of top 18 of associated side wall 16

DETAILED DESCRIPTION OF THE PREFERRED EMBODIMENTS

Introductory

Referring now to the figures, in which like numerals indicate like parts, and particularly to FIG. 1, the vented tonneau cover of the embodiments of the present invention is shown generally at 10 for a cargo bed 12 of a pickup truck 14.

The cargo bed 12 of the pickup truck 14 is defined by a pair of side walls 16 having tops 18, respectively, and a tailgate 20 to access the cargo bed 12 of the pickup truck 14.

The top 18 of each side wall 16 of the cargo bed 12 of the pickup truck 14 has a pair of ends 22. Each end 22 of the top 18 of each side wall 16 of the cargo bed 12 of the pickup truck 14 has a through bore 24 therein.

Overall Configuration of the Vented Tonneau Cover 10

The overall configuration of the vented tonneau cover 10 can best be seen in FIG. 1, and as such, will be discussed with reference thereto.

The vented tonneau cover 10 comprises netting 26 and an apparatus 28. The netting 26 is for covering the cargo bed 12 of the pickup truck 14, and the apparatus 28 is for holding down the netting 26 over the cargo bed 12 of the pickup truck 14.

Specific Configuration of the Netting 26

The specific configuration of the netting 26 can best be seen in FIG. 1, and as such, will be discussed with reference thereto.

The netting 26 is rectilinear-shaped, has a pair of axial boundaries 30, and is for overlying the cargo bed 12 of the pickup truck 14, while each axial boundary 30 of the netting 26 is for resting upon the top 18 of a respective side wall 16 of the cargo bed 12 of the pickup truck 14.

The netting 26 contains a plurality of through bores 32 for allowing the cargo bed 12 of the pickup truck 14 to vent and breathe.

The plurality of through bores 32 of the netting 26 are formed in a matrix. Each through bore 32 of the netting 26 is, preferably, round and, preferably, has a diameter of about 1" for preventing debris being carried in the cargo bed 12 of the pickup truck 14 from existing therethrough during motion of the pickup truck 14.

The netting 26 is made from at least one of heavy duty plastic and nylon, and can contain printed matter 33 for purposes including advertisement.

Specific Configuration of the Preferred Embodiment of the Apparatus 28

Figure 2:
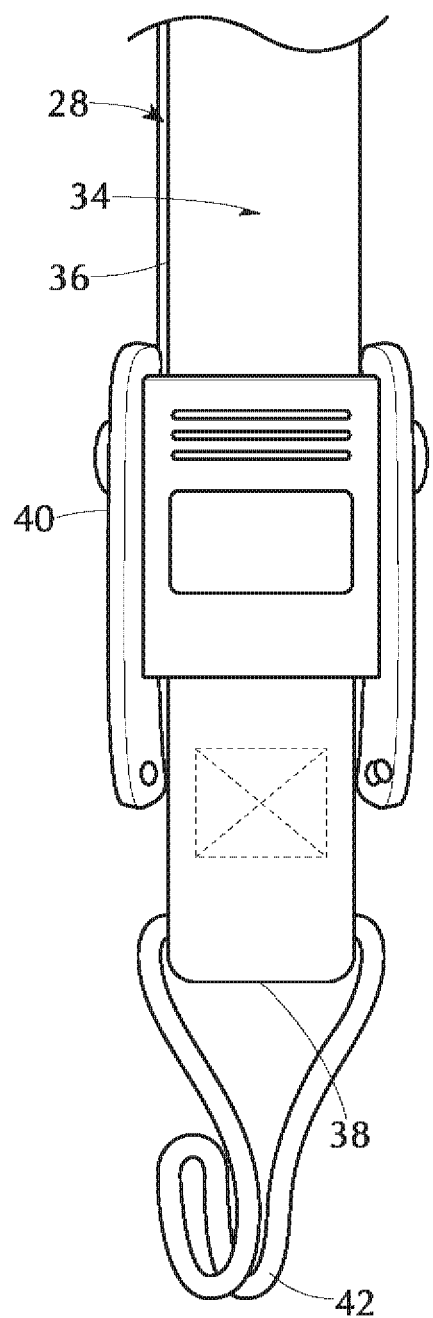
FIG. 2 is an enlarged dramatic perspective view of the area generally enclosed by the dotted oval identified by ARROW in FIG. 1.

The specific configuration of the preferred embodiment of the apparatus 28 can best be seen in FIGS. 1 and 2, and as such, will be discussed with reference thereto.

The apparatus 28 includes a pair of ratchet hold downs 34. Each ratchet hold down 34 of the apparatus 28 includes a ratchet assembly 40 and a strap 36 with a pair of ends 38.

The pair of ends 38 of the strap 36 of the ratchet assembly 40 of each ratchet hold down 34 of the apparatus 28 are for engaging an associated pair of axially aligned through bores 24 at the pair of ends 22 of the top 18 of the associated side wall 16, either by hooks and/or loops 42, depending upon truck vintage and/or owner's preference.

The ratchet assembly 40 of each ratchet hold down 34 of the apparatus 28 is operatively connected to, so as to tighten and loosen, the strap 36 of an associated ratchet hold down 34 of the apparatus 28.

The strap 36 of each ratchet hold down 34 of the apparatus 28 is for only running along the top 18 of a respective side wall 16 of the cargo bed 12 of the pickup truck 14.

The strap 36 of each ratchet hold down 34 of the apparatus 28 only runs over a respective axial boundary 30 of the netting 26 so as to sandwich the netting 26 therebetween, and in so doing, maintaining the netting 26 taunt.

Specific Configuration of the Alternate Embodiments of the Apparatus 128

The specific configuration of the alternate embodiment of the apparatus 128 can best be seen in FIG. 3, and as such, will be discussed with reference thereto.

The apparatus 128 includes a pair of bungee cords 134.

Each bungee cord 134 of the apparatus 128 includes an elastic strap 136 with a pair of ends 138.

The pair of ends 138 of the elastic strap 136 of each bungee cord 134 of the apparatus 128 include a pair of hooks 140, respectively, that are for engaging an associated pair of axially aligned through bores 124 at the pair of ends 122 of the top 118 of the associated side wall 116.

The elastic strap 136 of each bungee cord 134 of the apparatus 128 is for only running along the top 18 of a respective side wall 16 of the cargo bed 12 of the pickup truck 14 and over a respective axial boundary 130 of the netting 126 so as to sandwich the netting 126 therebetween, and in so doing, maintaining the netting 126 taunt.

Impressions

It will be understood that each of the elements described above, or two or more together, may also find a useful application in other types of constructions differing from the types described, supra.

While the embodiments of the present invention have been illustrated and described as embodied in a vented tonneau cover for a cargo bed of a pickup truck, nevertheless, they are not limited to the details shown, since it will be understood that various omissions, modifications, substitutions, and changes in the forms and details of the embodiments of the present invention illustrated and their operation can be made by those skilled in the art, without departing in any way from the spirit of the embodiments of the present invention.

Without further analysis, the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A vented tonneau cover for a cargo bed of a pickup truck, wherein the cargo bed of the pickup truck is defined by a pair of side walls having tops, respectively, and a tailgate to access the cargo bed of the pickup truck, wherein the top of each side wall of the cargo bed of the pickup truck has a pair of ends, wherein each end of the top of each side wall of the cargo bed of the pickup truck has a through bore therein, and wherein said vented tonneau covering comprising:
 a) netting for covering the cargo bed of the pickup truck; and
 b) means for holding down the netting over the cargo bed of the pickup truck; wherein said netting is rectilinear-shaped; wherein said netting has a pair of axial boundaries; wherein said netting is for overlying the cargo bed of the pickup truck, while each axial boundary of said netting is for resting upon the top of a respective side wall of the cargo bed of the pickup truck, wherein said netting contains a plurality of through bores; wherein said plurality of through bores of said netting is for allowing the cargo bed of the pickup truck to vent and breathe.

2. The vented tonneau cover of claim 1, wherein said plurality of through bores of said netting are formed in a matrix.

3. The vented tonneau cover of claim 1, wherein each through bore of said netting is round.

4. The vented tonneau cover of claim 1, wherein each through bore of said netting has a diameter of about 1" for preventing debris being carried in the cargo bed of the pickup truck from existing therethrough during motion of the pickup truck.

5. The vented tonneau cover of claim 1, wherein said netting is made from at least one of heavy duty plastic and nylon.

6. The vented tonneau cover of claim 1, wherein said netting contains printed matter for purposes including advertisement.

7. The vented tonneau cover of claim 1, wherein said means includes a pair of ratchet hold downs.

8. The vented tonneau cover of claim 7, wherein each ratchet holds down of said means includes a ratchet assembly.

9. The vented tonneau cover of claim 8, wherein each ratchet hold down of said means includes a strap with a pair of ends.

10. The vented tonneau cover of claim 9, wherein said pair of ends of the strap of said ratchet assembly of each ratchet hold down of said means engages an associated pair of axially aligned through bores at the pair of ends of the top of the associated side wall, either by hooks and/or loops, depending upon truck vintage and/or owner's preference.

11. The vented tonneau cover of claim 9, wherein said ratchet assembly of each ratchet hold down of said means is operatively connected to, so as to tighten and loosen, the strap of an associated ratchet hold down of said means.

12. The vented tonneau cover of claim 9, wherein said strap of each ratchet hold down of said means is for only running along the top of a respective side wall of the cargo bed of the pickup truck and over a respective axial boundary of the netting so as to sandwich the netting therebetween, and in so doing, maintaining the netting taunt.

* * * * *